(No Model.)

G. E. FOSTER.
CHECK HOOK FOR HARNESS.

No. 421,131. Patented Feb. 11, 1890.

WITNESSES:

INVENTOR:
G. E. Foster
BY Munn & Co
ATTORNEYS.

United States Patent Office.

GEORGE EMORY FOSTER, OF McPHERSON, CALIFORNIA.

CHECK-HOOK FOR HARNESS.

SPECIFICATION forming part of Letters Patent No. 421,131, dated February 11, 1890.

Application filed July 17, 1889. Serial No. 317,801. (No model.)

*To all whom it may concern:*

Be it known that I, GEORGE EMORY FOSTER, of McPherson, in the county of Los Angeles and State of California, have invented a new and useful Improvement in Check-Hooks for Harness, of which the following is a full, clear, and exact description.

The object of my invention is to provide a cheap and practical attachment to be applied to the check-hooks of harness to prevent the checkrein from accidentally dropping out from the hook and to prevent the lines from catching in the hook; and to this end my invention consists in combining with the hook a retaining-plate to engage the point of the hook and close the entrance thereto and adapted to receive the back-band strap which serves to normally hold the plate in position to prevent the escape of the checkrein from the hook.

The invention also consists of the special construction and combination of parts, all as hereinafter described and claimed.

Reference is to be had to the accompanying drawings, forming a part of this specification, in which similar letters of reference indicate corresponding parts in both the figures.

Figure 1:
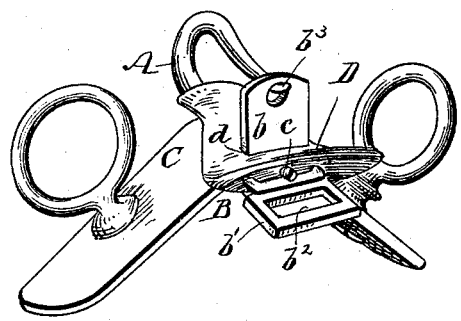
Figure 2:
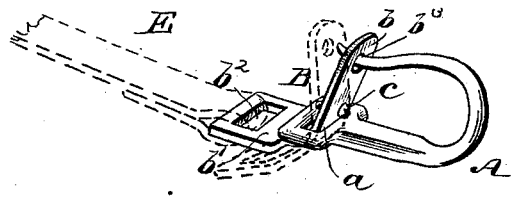

Figure 1 is a perspective view of an ordinary gig-saddle having my invention applied thereto, and Fig. 2 is a perspective view of a check-hook used on draft-harness and having my invention applied thereto.

A represents a check-hook, and B the retaining-plate to close the entrance of the hook to retain the checkrein when placed therein.

In Fig. 1 the hook is shown applied to the tree C and saddle D. The latter is slotted at $d$, and the upright part $b$ of the retaining-plate B is passed up therethrough. The retaining-plate is angular in form. As here shown, is bent in the center to form nearly a right angle. The upper part $b$, when the lower portion $b'$ is in horizontal position, closes the entrance to the hook A, as shown in full lines in Fig. 2; but when the lower end is tipped downward, as shown in dotted lines in Fig. 2, the upper part will fall back from the hook and permit free entrance or exit of the checkrein.

In Fig. 2 the hook A is formed with a slot or loop $a$, which receives the retaining-plate B the same as slot $d$ in Fig. 1, and in which the plate, as in Fig. 1, acts as on a hinge. The lower part $b'$ of the retaining-plate is formed with a loop or slot $b^2$, in which the back-strap E of the harness is placed—that is, this loop takes the place of the loop $a$ in the ordinary hooks or hooks for ordinary draft-harness, and the place of an extra loop usually used at the back of the saddle D. The stress on the back-band is therefore taken by the retaining-plate, which normally holds the plate in the position shown in Fig. 1, with the orifice $b^3$ closed over the point of the hook.

In order to place the checkrein in the hook, it is only necessary to press down upon the back-strap, which will turn the retaining-plate back away from the point of the check-hook. When the back-strap is relieved of pressure, the retaining-plate is automatically brought to closed position to prevent the checkrein from accidentally dropping out. The plate also prevents the line from catching on the check-hook. The plate is held in place in the hook and saddle by a small screw $c$, as shown clearly in the drawings.

Having thus described my invention, what I claim as new, and desire to secure by Letters Patent, is—

1. In a check-hook for harness, the retaining-plate B, bent in the center and formed with an upright plate $b$ and lower plate $b'$, slotted at $b^2$, in combination with a check-hook slotted to receive the upright plate which serves to close the entrance to the hook, substantially as described.

2. A check for harness, comprising the hook A and retaining-plate B, bent in the center and formed with orifice $b^3$, in combination with the saddle D, having the slot $d$, substantially as described.

GEORGE EMORY FOSTER.

Witnesses:
T. F. HARDAWAY,
J. A. FOSTER.